(12) United States Patent
Allen et al.

(10) Patent No.: US 7,629,080 B1
(45) Date of Patent: Dec. 8, 2009

(54) ELECTRODE MATERIALS FOR ELECTROCHEMICAL CELLS

(75) Inventors: Jan L. Allen, Silver Spring, MD (US); T. Richard Jow, Potomac, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 839 days.

(21) Appl. No.: 11/185,845

(22) Filed: Jul. 21, 2005

Related U.S. Application Data

(60) Provisional application No. 60/591,965, filed on Jul. 23, 2004.

(51) Int. Cl.
*H01M 4/36* (2006.01)

(52) U.S. Cl. .................. 429/221; 429/223; 429/224; 429/231.6; 429/229; 429/231.95; 429/231.1; 252/182.1

(58) Field of Classification Search .................. 429/221, 429/223, 224, 231.6, 229, 231.95, 231.1; 252/182.1
See application file for complete search history.

(56) References Cited

U.S. PATENT DOCUMENTS

| 5,871,866 | A | 2/1999 | Barker et al. |
| 5,910,382 | A | 6/1999 | Goodenough et al. |
| 6,085,015 | A | 7/2000 | Armand et al. |
| 6,136,472 | A | 10/2000 | Barker et al. |
| 6,153,333 | A | 11/2000 | Barker et al. |
| 6,203,946 | B1 | 3/2001 | Barker et al. |

(Continued)

FOREIGN PATENT DOCUMENTS

CA  2251709 B1  10/1997

(Continued)

OTHER PUBLICATIONS

Allen et al. "Li1+xFe1−xPO4: electronically conductive lithium iron phospho-olivines with improved electrochemical performance" Proceedings-Electrochemical Society (2004), 2003-28 (Lithium and Lithium-ion batteries), 198-205. This paper presented at the Lithium-Ion Battery Symposium at theElectrochemical Society Fall Meeting held Oct, 2003.*

(Continued)

*Primary Examiner*—Laura S Weiner
(74) *Attorney, Agent, or Firm*—William V. Adams; Lawrence E. Anderson

(57) ABSTRACT

A lithiated metal phosphate material is doped by a portion of the lithium atoms which are present at the M2 sites of the material. The doped material has the general formula: $Li_{1+x}M_{1-x-d}D_dPO_4$. In the formula, M is a divalent ion of one or more of Fe, Mn, Co and Ni. D is a divalent metal ion which is one or more of Mg, Ca, Zn, and Ti. It is present in an amount represented by the subscript d which has a value ranging from 0 to 0.1. The portion of the lithium which is present at the M2 octahedral sites of the material is represented by the subscript x and is greater than 0 and no more than 0.07. Also disclosed are electrodes which incorporate the material as well as batteries, including lithium ion batteries, which include cathodes fabricated from the doped, lithiated metal phosphate materials.

19 Claims, 4 Drawing Sheets

LiFePO4

U.S. PATENT DOCUMENTS

| | | |
|---|---|---|
| 6,387,568 B1 | 5/2002 | Barker et al. |
| 6,447,951 B1 | 9/2002 | Barker et al. |
| 6,514,640 B1 | 2/2003 | Armand et al. |
| 6,528,033 B1 | 3/2003 | Barker et al. |
| 6,645,452 B1 | 11/2003 | Barker et al. |
| 6,702,961 B2 | 3/2004 | Barker et al. |
| 6,716,372 B2 | 4/2004 | Barker et al. |
| 6,720,110 B2 | 4/2004 | Barker et al. |
| 6,723,470 B2 | 4/2004 | Barker et al. |
| 6,730,281 B2 | 5/2004 | Barker et al. |
| 6,814,764 B2 * | 11/2004 | Hosoya et al. ............... 429/221 |
| 2003/0082454 A1 | 5/2003 | Armand et al. |

FOREIGN PATENT DOCUMENTS

| | | |
|---|---|---|
| EP | 0904607 | 3/1999 |
| WO | 9740541 A1 | 10/1997 |

OTHER PUBLICATIONS

Thackeray, Michael, "Lithium-Ion Batteries: An Unexpected Conductor," 2002 Nature Publishing Group, vol. 1, Nature Materials 1, 81-82 (2002).

Pahdi, K.A., Nanjundaswamy, K.S. & Goodenough, J.B. Phospho-olivines as positive electrode materials for rechargeable lithium batteries. J. Electrochem. Soc., 144, 1188-1194 (1997).

Andersson, A.S., Thomas, J.0., Kalska, B. & Häggström, L. Thermal stability of LiFePO4-based cathodes. Electrochem. Solid State Lett., 3, 66-68 (2000).

MacNeil, D.D., Lu, Z.H., Chen, Z.H.& Dahn, J.R. A comparison of the electrode/electrolyte reaction at elevated temperatures for various Li-ion battery cathodes. J. Power Sources, 108, 8-14 (2002).

Takahashi, M., Tobishima, S., Takei, K. & Sakurai, Y. Reaction behavior of L1FePO4 as a cathode material for rechargeable lithium batteries. Solid State Ionics 148, 283-289 (2002).

Ravet, N. et al. Improved iron based cathode material. Abstract No. 127, Electrochemical Society Fall Meeting, Honolulu, Hawaii, (1999).

Huang, H., Yin, S.-C., & Nazar, L.F. Approaching theoretical capacity of LiFePO4 at room temperature at high rates. Electrochem. Solid State Lett., 4, A170-A172 (2001).

Prosini, P.P., Zane, D. & Pasquali, M. Improved electrochemical performance of a LiFePO4-based composite cathode. Electrochim. Acta, 46, 3517-3523 (2001).

Yamada, A, Chung, S.C. & Hinokuma, K. Optimized LiFePO4 for lithium battery cathodes. J. Electrochem. Soc., 148, A224-A229 (2001).

Chung, S.-Y., Bloking, J.T. & Chiang, Y.-M. Electronically conductive phospho-olivines as lithium storage electrodes. Nat. Mater. 1, 123-128 (2002).

Ravet, N. Abouimrane, A. & Armand, M. From our readers—On the electronic conductivity of phosphoolivines as lithium storage electrodes. Nat. Mater. 2, 702 (2003).

Herle, P.S., Ellis, B., Coombs, N. & Nazar, L.F., Nano-network electronic conduction in iron and nickel olivine phosphates. Nat. Mater. 3, 147-152 (2004).

Shannon, R.D. Revised effective ionic-radii and systematic studies of interatomic distances in halides and chalcogenides. Acta Crystallogr. Sect.A, 32, 751-767 (1976).

Nordgren, G. Bray, S. Cramm, R. Nyholm, J.-E. Rubensson, N. Wassdahl, "Soft x-ray emission spectroscopy using monochromatized synchrotron radiation." Review of Scientific Instruments (1989), 60(7, Pt. 2A), 1690-6 CODEN: RSINAK; ISSN: 0034-6748.

Molenda, J., Stoklosa, A. & Bak, T. Modifications in the electronic structure of cobalt bronze LixCoO2 and the resulting electrochemical properties. Solid State Ionics, 36, 53-58 (1989).

Shimakawa, Y., Numata, T. & Tabuchi, J. Verwey-type transition and magnetic properties of the LiMn2O4 spinels. J. Solid State Chem., 131, 138-143 (1997).

Kawai, H., Nagatab, M., Kageyamac, H., Tukamoto, H. & West, A.R. 5 V lithium cathodes based on spinel solid solutions Electrochim. Acta, 45, 315-327 (1999).

A. Augustsson, G.V. Zhuang et al "Electronic Structure of Phospho-olivines LixFePO4, x=0,1 . . . from soft-x-ray-absorption and -emission spectroscopies," The Journal of Chemical Physics 123, 184717 (2005).

F.M.F. de Groot, J. e. Fuggle, B.T. thole and G. A. Sawatzky, "2p x-ray absorption of 3d transition-metal compounds: An atomic multiplet description including the crystal field," Phys. Rev. B. 42, 5459 (1990).

G. van der Laan and J.W. Kirkman, "The 2p absorption spectra of 3d transition metal compounds in tetrahedral and octahedral symmetry," J Phys. Can dens. Matter, 4, 4189 (1992).

F.M.F. de Groot. M. Grioni, J.e. Fuggle, 1. Ghijsen, G.A. Sawatzky and H. Petersen, "Oxygen 1s X-ray Absorption Edges of transition metal oxides," Phys. Rev. B, 40,5715 (1989)T.

* cited by examiner

LiFePO4

ELECTRODE MATERIALS FOR ELECTROCHEMICAL CELLS

RELATED APPLICATION

This patent application claims priority of provisional patent application Ser. No. 60/591,965 entitled "Cathode Materials for Secondary (Rechargeable) Lithium Batteries," filed Jul. 23, 2004.

GOVERNMENT INTEREST

The invention described herein may be manufactured, used, and licensed by or for the United States Government.

FIELD OF THE INVENTION

This invention relates to electrochemical materials. More specifically, the invention relates to lithiated metal phosphate materials. In particular, the invention relates to a particular class of lithiated metal phosphate materials wherein some portion of the lithium therein is disposed at M2 octahedral sites on the lattice of said material.

BACKGROUND OF THE INVENTION

Because of issues of cost and safety, lithiated metal phosphate materials are finding increasing utility as components of electrodes for electrochemical devices, and in particular as components of cathodes for rechargeable lithium-ion batteries. In the operation of such batteries, lithium ions are transferred, via an appropriate electrolyte, from the cathode to the anode during charging and from the anode to the cathode during discharge.

Lithiated metal phosphates have good thermal stability, low reactivity with electrolytes, and can be made from inexpensive and abundant raw materials. Lithiated metal phosphates have very good lithium ion transport and storage properties which allows for the manufacture of lithium ion batteries having large charge storage capability. However, these materials have relatively low electronic conductivity, and this factor limits their use in electrochemical devices.

The prior art has implemented various approaches in an effort to enhance the electronic conductivity of this class of materials. In one approach, particles of lithiated metal phosphates are coated with an electrically conductive material such as carbon. This does enhance the electronic conductivity of the materials; however, the carbon, while having good electronic conductivity, has poor storage and transport properties for lithium ions; hence, the presence of carbon decreases the specific electrochemical capacity and lowers the tap density of the electrode material. Another prior art approach to enhancing the electronic conductivity of these materials involves the use of dopants. In some instances, dopant metals were added to the M1 (lithium) site of the material; however, doped materials thus produced should impede lithium ion conduction by blockage of the conduction path. In addition, general skepticism has been expressed in the art regarding aliovalent doping of lithium iron phosphate materials insofar as it was believed that the olivine structure is unfavorable to such doping. In view of the foregoing, the art has generally looked to the use of composite materials such as carbon-coated materials for providing electrically and ionically conductive metal phosphate electrode materials.

As will be explained in detail hereinbelow, the present invention breaks with prior art approaches and provides a doped, lithiated metal phosphate material having good transport properties for both electrons and lithium ions. As such, the present invention provides for the manufacture of improved electrochemical devices, and in particular improved, rechargeable lithium ion batteries.

SUMMARY OF THE INVENTION

There is disclosed herein a material which may be utilized in an electrode for an electrochemical device as well as electrodes which incorporate that material. The material has the general formula $Li_{1+x}M_{1-x-d}D_dPO_4$. In the material, M is selected from the group consisting of a divalent ion of one or more of: Fe, Mn, Co, and Ni. D is selected from the group consisting of divalent ions of one or more of Mg, Ca, Zn, and Ti. The subscript d has a value ranging from 0 to 0.1. In the material of the present invention a portion of the Li is present at the M2 octahedral site of the material, and as such substitutes for Fe at that site and functions as a dopant. The portion of the Li which is present at the M2 sites is represented by the subscript x, and is present in an amount greater than 0, and ranging up to 0.07 atomic percent.

In particular embodiments of the invention, the metal M is iron, while in other specific embodiments M is a mixture of iron and at least one of the other metals of the group. In other specific embodiments, the metal D is also disposed at the M2 octahedral site of the material.

The present invention also includes electrochemical cells which incorporate the electrodes of the present invention. Those electrochemical cells may comprise lithium ion batteries wherein the electrode of the present invention is a cathode of said batteries.

DESCRIPTION OF THE INVENTION

The present invention is directed to lithium metal phosphate materials which have good electronic and ionic conductivity. The materials are useful as electroactive materials for electrochemical devices wherein lithium ion removal and insertion takes place in the materials.

Figure 1:
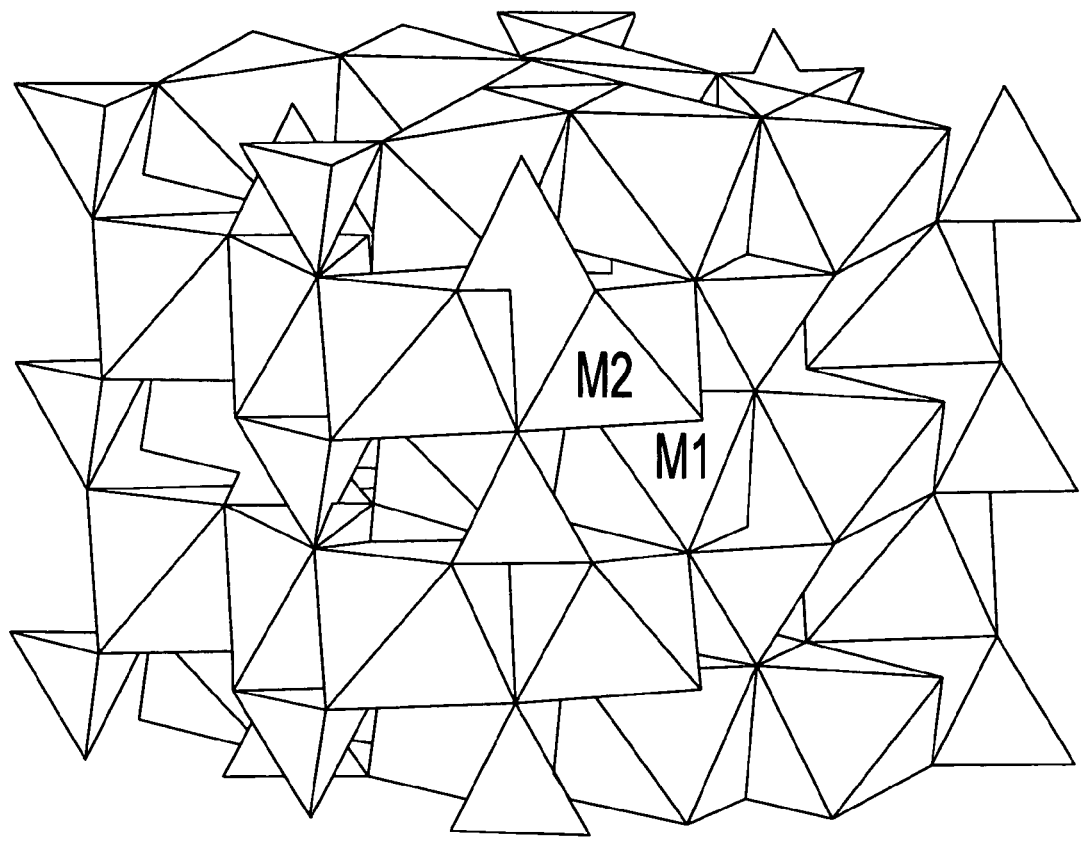
FIG. 1 is a depiction of a lithiated iron phosphate material of the present invention having an olivine structure.

The materials of the present invention have an olivine structure and a lithiated iron phosphate having such a structure is illustrated in FIG. 1. As will be seen, in materials of this type, lithium occupies the M1 octahedral sites and iron occupies the M2 octahedral sites while phosphorus is at the tetrahedral sites of the material. In the materials of the present invention, some portion of the lithium is present at the M2 sites, and as such functions as an aliovalent dopant which increases the electronic conductivity of the material. In general, the materials of the present invention are of the formula:

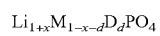

$Li_{1+x}M_{1-x-d}D_dPO_4$ wherein M is a divalent metal ion which may be one or more of Fe, Mn, Co, and Ni. D is a divalent metal ion which is optionally present in the material and is selected from one or more of Mg, Ca, Zn, and Ti. d has a value in the range of 0 to 0.1. The portion of the lithium which is present at the M2 octahedral sites of the material is greater than 0 and ranges up to 0.07 atomic percent, and that portion is represented by the subscript x. The portion of the lithium which is not at the M2 sites is at the M1 sites.

As noted above, the materials of the present invention have particular advantage as cathode materials for lithium batteries. As is known in the art, lithium is transferred from the cathode to the anode of the battery during charging, and from the anode to the cathode during discharge. The typical battery includes an electrolyte which is capable of solvating the lithium ions, and it includes an anode which may be fabricated from a wide variety of materials which are compatible with the electrolyte and the cathode material. In the material of the present invention, the doping of the lithium to the M2 sites increases the electronic conductivity of the material, and the configuration of the material of the present invention provides for good lithium ion transport therethrough.

Figure 2:
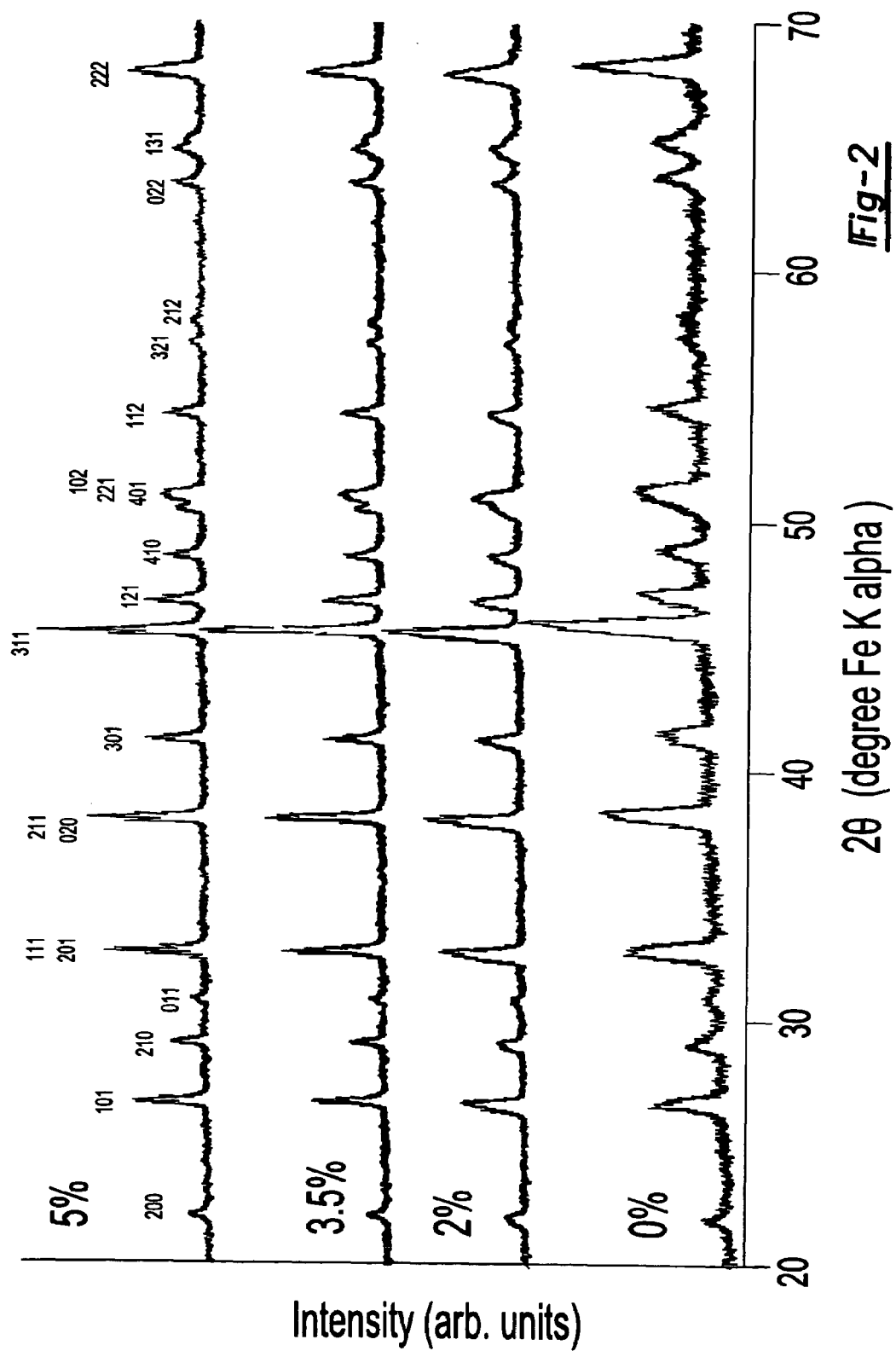
FIG. 2 is an X-ray diffraction pattern of a series of lithiated iron phosphate materials illustrative of the present invention wherein the samples include varying amounts of lithium disposed at the M2 sites of that material.

X-ray diffraction data confirms that lithium is present at the M2 site of the material of the present invention. FIG. 2 comprises X-ray diffraction data for a series of lithiated iron phosphate materials wherein increasing amounts of lithium were doped to the M2 sites of the material. This data confirms that lithium is in fact present at the M2 sites.

Powder diffraction patterns were recorded using Fe $K\alpha_{1,2}$ radiation at a wavelength of 1.9373 angstroms utilizing a Philips diffractometer. Data were collected at room temperature by step scanning over the angular range of $20° \leq 2\Theta \leq 70°$ in increments of $0.02°$ $2\Theta$. Accurate d-spacings of the observed peaks in the X-ray powder diffraction pattern were obtained by use of NIST-traceable silicon as an internal standard. Lattice constants were calculated using a nonlinear least squares refinement of the d-spacings. A lattice constant determination showed a 1-1.5% contraction of the unit cell for all doped samples. The slight contraction in the unit cell is in accordance with the slightly smaller size of the $Li^+$ ion relative to the $Fe^{+2}$ ion. Rietveld simulations of XRD patterns show that as the amount of lithium replacing iron on the M2 site increases, there will be change in the relative intensities of certain reflections as would be expected owing to the large difference in electron density between $Li^+$ and $Fe^{+2}$. For example, one expects that as the doping level increases, the ratio of the intensities of the 101 peak to that of the 311 peak should increase. The experimental XRD data is in agreement with this prediction and confirms that the lithium dopant is at M2 sites.

Figure 3:
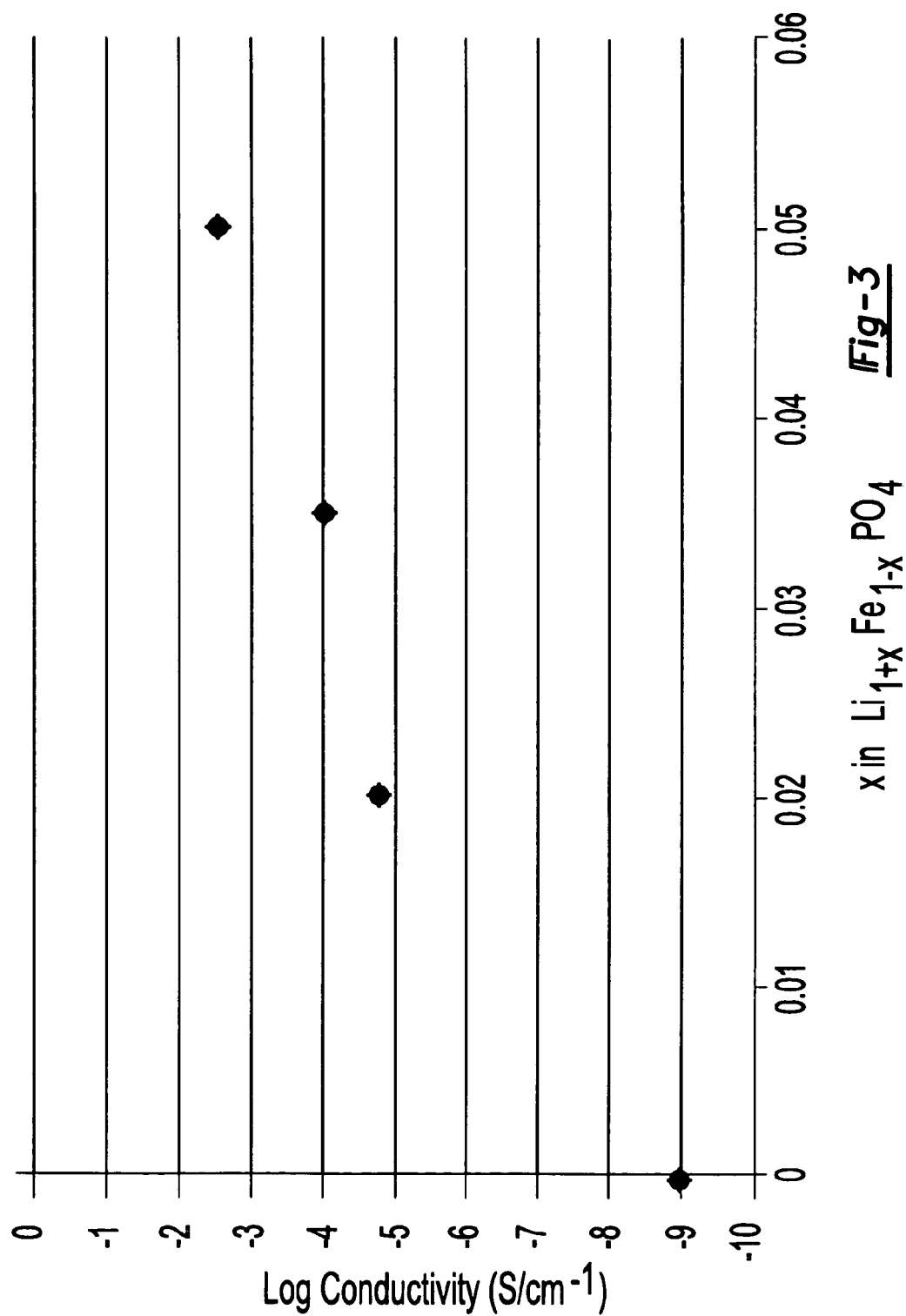
FIG. 3 is a graph showing electrical conductivity of the samples of FIG. 2, as a function of varying amounts of lithium at the M2 sites thereof.
Figure 4:
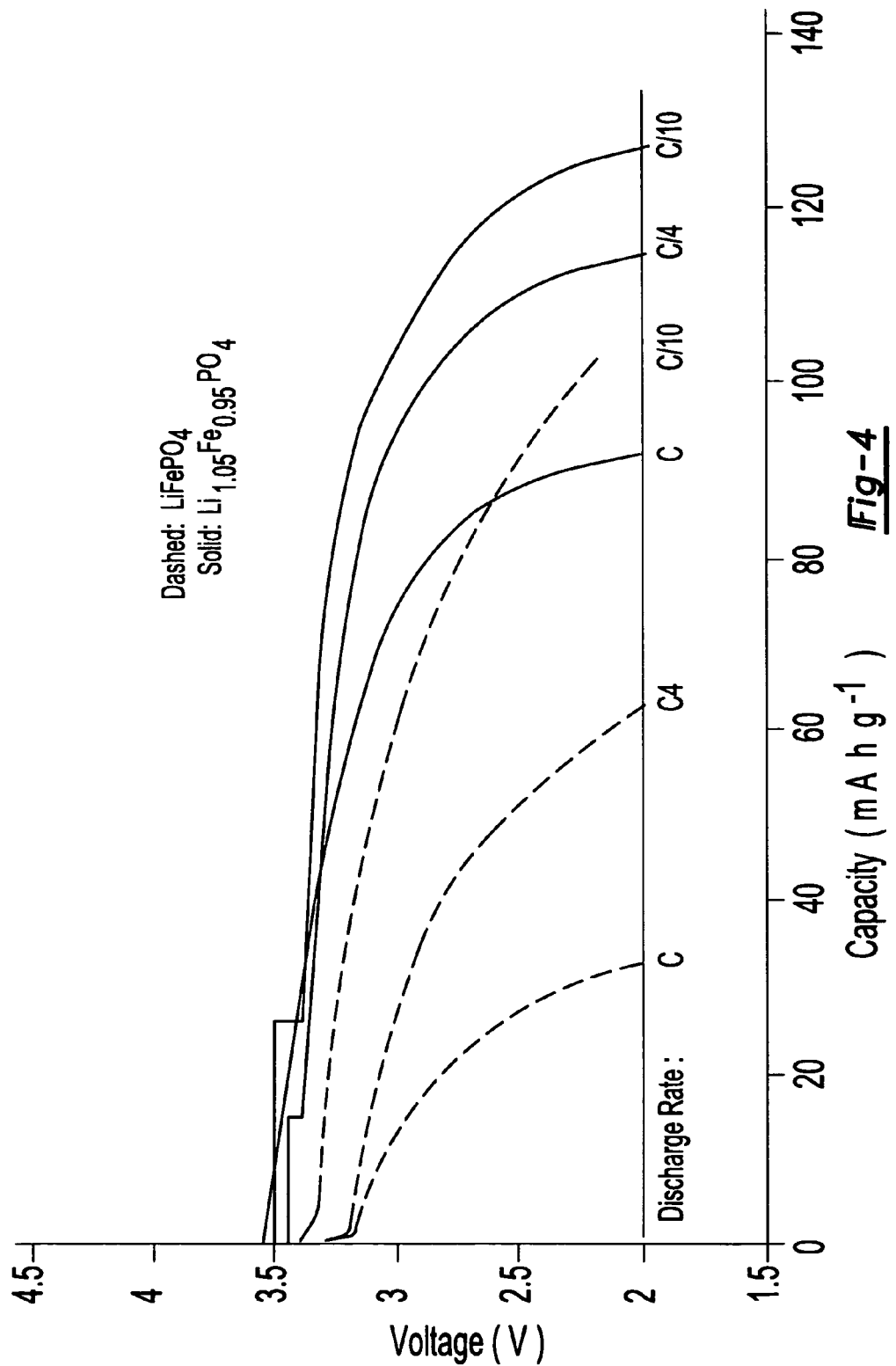
FIG. 4 is a graph of voltage versus capacity of lithium batteries of the prior art and of the present invention, at various discharge rates.

In the material of the present invention, the electrical conductivity has been found to be correlated with the doping level of the material. Referring now to FIG. 3, there is shown electrical conductivity of the material of FIG. 2. The first data point on the graph represents an undoped lithiated iron phosphate wherein the value of the subscript x is 0. The second data point represents a 2% doping wherein the value of the subscript x is 0.02. The conductivity of this material increases to $1.8 \times 10^{-5}$ $cm^{-1}$. The third data point shows a 3.5% doping level wherein the subscript x is 0.035. The conductivity of this material is $1.1 \times 10^{-4}$ $S\ cm^{-1}$. The fourth data point represents a 5% doping level wherein the subscript x is 0.05, and the conductivity of this material is $3.5 \times 10^{-3}$ $S\ cm^{-1}$. The sign of the thermopower of material indicated extrinsic p-type doping for all of the doped samples.

Further electrochemical testing was carried out on the 5% doped material, that is to say the material having the formula $Li_{1.05}Fe_{0.95}PO_4$. This material and undoped material were incorporated into test cells, and voltage versus capacity of the cells was measured at the varying discharge rates for both samples. As will be seen, the capacity of the control sample dropped off quickly as the rate of discharge increased whereas the materials of the present invention demonstrate a significant improvement in capacity retention with increasing discharge rate. Specifically, the undoped materials of the prior art showed a significant drop in capacity as the rate of discharge was increased from 105 mA h $g^1$ at a c/10 rate to 63 and 33 mA h $g^1$ for c/4 and c rates respectively. This type of loss in capacity with increased rate is well documented in the art. A significant improvement in capacity retention with increasing discharge was noted for the doped material of the present invention. Specifically, the capacity was 128 mA h $g^{-1}$ at a c/10 rate decreasing only to 115 and 92 mA h $g^{-1}$ at c/4 and c rates respectively.

Some specific examples of materials of the present invention, their methods of preparation, and measurements of their properties are set forth hereinbelow, it being understood that these examples are illustrative of, but not limitations upon the practice of, the present invention.

EXAMPLES

Example 1

$Li_{1.02}Fe_{0.98}PO_4$ samples were prepared in a two-step fashion by first mixing 0.6010 g $Li_2CO_3$ (Alfa, 99.0+%), 2.8112 g $FeC_2O_4 2H_2O$ (Alfa, 99.999%) and 1.8340 g $NH_4H_2PO_4$ (Aldrich 99.99+%). The powders were mixed in a jar mill for 1 hour utilizing acetone as lubricant. The acetone was evaporated away under a flow of $N_2$ at room temperature. The resulting intimately mixed powder was then placed in a nickel combustion boat, and subsequently heated under $N_2$ for 12 hours at 350° C. in a tube furnace. The furnace-cooled reaction mixture was then reground via jar milling for 1 hour in an acetone slurry. The dried powder was now pelletized, placed in an alumina boat, and then subject to a 14-hour heating step at 800° C. under a flowing atmosphere of 2.5% $H_2$ in $N_2$.

Conductivity was measured using a four-probe arrangement. A rectangular parallelepiped was cut from each sintered disc using a diamond saw. Nickel foil leads were attached using silver conductive paste (Aldrich) as an adhesive. A Keithley Model 2000 multimeter was used to measure the resistance. The resistivity and its inverse, the conductivity, were calculated using Ohm's law. The conductivity was found to be $1.8 \times 10^{-5}$ $S\ cm^{-1}$. The sign of the thermopower was determined by applying a temperature gradient across each sample and noting the change in voltage. The voltage change evidenced p-type conductivity.

Example 2

$Li_{1.035}Fe_{0.965}PO_4$ samples were prepared in a two-step fashion by first mixing 0.6127 g $Li_2CO_3$ (Alfa, 99.0+%), 2.7812 g $FeC_2O_4 2H_2O$ (Alfa, 99.999%) and 1.8428 g $NH_4H_2PO_4$ (Aldrich 99.99+%). The powders were mixed in a jar mill for 1 hour utilizing acetone as lubricant. The acetone was evaporated away under a flow of $N_2$ at room temperature. The resulting intimately mixed powder was then placed in a nickel combustion boat, and subsequently heated under $N_2$ for 12 hours at 350° C. in a tube furnace. The furnace-cooled reaction mixture when then reground via jar milling for 1 hour in an acetone slurry. The dried powder was now pelletized, placed in an alumina boat, and then subjected to a 14-hour heating step at 800° C. under a flowing atmosphere of 2.5% $H_2$ in $N_2$.

Conductivity was measured using a four-probe arrangement. A rectangular parallelepiped was cut from each sintered disc using a diamond saw. Nickel foil leads were attached using silver conductive paste (Aldrich) as an adhesive. A Keithley Model 2000 multimeter was used to measure the resistance. The resistivity and its inverse, the conductivity, were calculated using Ohm's law. The conductivity was found to be $1.11\times10^{-4}$ S cm$^{-1}$. The sign of the thermopower was determined by applying a temperature gradient across each sample and noting the change in voltage. The voltage change evidenced p-type conductivity.

Example 3

$Li_{1.05}Fe_{0.95}PO_4$ samples were prepared in a two-step fashion by first mixing 0.6245 g $Li_2CO_3$ (Alfa, 99.0+%), 2.7509 g $FeC_2O_4 2H_2O$ (Alfa, 99.999%) and 1.8516 g $NH_4H_2PO_4$ (Aldrich 99.99+%). The powders were mixed in a jar mill for 1 hour utilizing acetone as a lubricant. The acetone was evaporated away under a flow of $N_2$ at room temperature. The resulting intimately mixed powder was then placed in a nickel combustion boat, and subsequently heated under $N_2$ for 12 hours at 350° C. in a tube furnace. The furnace-cooled reaction mixture was then reground via jar milling for 1 hour in an acetone slurry. The dried powder was now pelletized, placed in an alumina boat, and then subjected to a 14-hour step at 800° C. under a flowing atmosphere of 2.5% $H_2$ in $N_2$.

Conductivity was measured using a four-probe arrangement. A rectangular parallelepiped was cut from each sintered disc using a diamond saw. Nickel foil leads were attached using silver conductive paste (Aldrich) as an adhesive. A Keithley Model 2000 multimeter was used to measure the resistance. The resistivity and its inverse, the conductivity, were calculated using Ohm's law. The conductivity was found to be $3.5\times10^{-3}$ S cm$^{-1}$. The sign of the thermopower was determined by applying a temperature gradient across each sample and noting the change in voltage. The voltage change evidenced p-type conductivity.

The foregoing examples describe materials wherein iron is the sole metal defined by M in the formula. It is to be understood that the formulations including divalent ions of other metals such as Mn, Co, and Ni may be similarly prepared. In some instances, materials of the present invention may include a mixture of these metals therein, and some specific formulations include iron and one or more of Mn, Ni, and Co.

In yet other embodiments of the present invention a second metal represented by D in the above formula is also present in the material, typically at an M2 site. The second metal D may comprise a divalent ion of one or more of Mg, Ca, Zn, and Ti. The metal D, when present, is typically at a concentration, represented by subscript d, ranging up to 0.1. Some specific examples of materials of this type comprise: $Li_{1.05}Fe_{0.90}Mg_{0.05}PO_4$; $Li_{1.02}Fe_{0.92}Ti_{0.06}PO_4$, and $Li_{1.03}Fe_{0.95}Zn_{0.02}PO_4$. Yet other materials will be readily apparent to those of skill in the art in view of the teaching presented herein.

It is to be understood that the foregoing drawings, discussion, examples and description are illustrative of particular embodiments of the present invention but are not meant to be limitations upon the practice thereof. In view of the teaching presented herein, yet other embodiments, modifications and variations of the present invention will be readily apparent to those of skill in the art. It is the following claims, including all equivalents, which define the scope of the invention.

The invention claimed is:

1. An electrode for an electrochemical device, said electrode comprising a material having the formula:

$$Li_{1+x}M_{1-x-d}D_dPO_4$$

wherein M is selected from the group consisting of: $Fe^{+2}$, $Mn^{+2}$, $Co^{+2}$, $Ni^{+2}$, and combinations thereof;

D is selected from the group consisting of: $Mg^{+2}$, $Ca^{+2}$, $Zn^{+2}$, $Ti^{+2}$, and combinations thereof;

d has a value in the range of 0 to 0.1; and a portion of said Li is present at the M2 octahedral sites of said material, said portion being greater than 0 and no more than 0.07 atomic percent of the total atoms at the M2 sites, said portion being represented by x.

2. The electrode of claim 1, wherein said portion of Li which is not at said M2 octahedral sites of said material is at the M1 octahedral sites of said material.

3. The electrode of claim 1, wherein M is $Fe^{+2}$.

4. The electrode of claim 1, wherein M is a mixture of $Fe^{+2}$ and a member selected from the group consisting of: $Mn^{+2}$, $Ni^{+2}$, and $Co^{+2}$.

5. The electrode of claim 1 wherein D is present at M2 octahedral sites of said material.

6. The electrode of claim 1, wherein lithium at the M2 sites increases the electronic conductivity and provides for good lithium transport though the material.

7. The electrode of claim 1, wherein the electrode comprises a material formed by mixing $Li_2CO_3$, $FeC_2O_4 2H_2O$ and $NH_4H_2PO_4$ utilizing acetone as lubricant; evaporating the acetone away under a flow of $N_2$ at room temperature; placing the material in a nickel combustion boat, heating under $N_2$ at approximately 350° C. in a tube furnace; cooling the mixture; regrinding by jar milling for approximately 1 hour in an acetone slurry; pelletizing the ground powder, placing the material in an alumina boat, and then subjecting the material to an approximate 14-hour heating at 800° C. under a flowing atmosphere of 2.5% $H_2$ in $N_2$.

8. An electrode for an electrochemical device, said electrode comprising a material having the formula:

$$Li_{1+x}M_{1-x-d}D_dPO_4$$

wherein M is selected from the group consisting of: $Fe^{+2}$, $Mn^{+2}$, $Co^{+2}$, $Ni^{+2}$, and combinations thereof;

D is selected from the group consisting of: $Mg^{+2}$, $Ca^{+2}$, $Zn^{+2}$, $Ti^{+2}$, and combinations thereof;

d s has a value of 0; and a portion of said Li is present at the M2 octahedral sites of said material, said portion being greater than 0 and no more than 0.07 atomic percent of the total atoms at the M2 sites said portion being represented by x.

9. A rechargeable electrochemical cell having a cathode comprised of a material having the formula:

$$Li_{1+x}M_{1-x-d}D_dPO_4$$

wherein M is selected from the group consisting of: $Fe^{+2}$, $Mn^{+2}$, $Co^{+2}$, $Ni^{+2}$, and combinations thereof;

D is selected from the group consisting of $Mg^{+2}$, $Ca^{+2}$, $Zn^{+2}$, $Ti^{+2}$, and combinations thereof;

d has a value in the range of 0 to 0.1; and a portion of said Li is present at the M2 octahedral sites of said material, said portion being greater than 0 and no more than 0.07 atomic percent of the total atoms at the M2 sites, said portion being represented by x.

10. The electrochemical cell of claim 9, comprising a lithium ion cell.

11. The electrochemical cell of claim 9, wherein lithium at the M2 sites increases the electronic conductivity and provides for good lithium transport though the material.

12. An electrochemically active material having the formula:

$$Li_{1+x}M_{1-x-d}D_dPO_4$$

wherein M is selected from the group consisting of: $Fe^{+2}$, $Mn^{+2}$, $Co^{+2}$, $Ni^{+2}$, and combinations thereof;

D is selected from the group consisting of: $Mg^{+2}$, $Ca^{+2}$, $Zn^{+2}$, $Ti^{+2}$, and combinations thereof;

d has a value in the range of 0 to 0.1; and a portion of said Li is present at the M2 octahedral sites of said material, said portion being greater than 0 and no more than 0.07 atomic percent of the total atoms at the M2 sites, said portion being represented by x.

13. The material of claim 12, further comprising M1 and M2 octahedral sites; wherein said portion of Li which is not at said M2 octahedral sites of said material is at the M1 octahedral sites of said material.

14. The material of claim 12, wherein M is $Fe^{+2}$.

15. The material of claim 12, wherein M is a mixture of $Fe^{+2}$ and a member selected from the group consisting of: $Mn^{+2}$, $Ni^{+2}$, and $Co^{+2}$.

16. The material of claim 12, wherein D is present at M2 octahedral sites of said material.

17. The material of claim 12, wherein lithium at the M2 sites increases the electronic conductivity and provides for good lithium transport though the material.

18. The material of claim 12 prepared by steps comprising mixing $Li_2CO_3$, $FeC_2O_4 2H_2O$ and $NH_4H_2PO_4$ utilizing acetone as lubricant; evaporating the acetone away under a flow of $N_2$ at room temperature; placing the material in a nickel combustion boat, heating under $N_2$ at approximately 350° C. in a tube furnace; cooling the mixture; regrinding by jar milling for approximately 1 hour in an acetone slurry; pelletizing the ground powder, placing the material in an alumina boat, and then subjecting the material to an approximate 14-hour heating at 800° C. under a flowing atmosphere of 2.5% $H_2$ in $N_2$.

19. An electrochemically active material having the formula:

$$Li_{1+x}M_{1-x-d}D_dPO_4$$

wherein M is selected from the group consisting of: $Fe^{+2}$, $Mn^{+2}$, $Co^{+2}$, $Ni^{+2}$, and combinations thereof;

D is selected from the group consisting of: $Mg^{+2}$, $Ca^{+2}$, $Zn^{+2}$, $Ti^{+2}$, and combinations thereof;

d has a value of 0; and a portion of said Li is present at the M2 octahedral sites of said material said portion being greater than 0 and no more than 0.07 atomic percent of the total atoms at the M2 site, said portion being represented by x.

* * * * *